United States Patent
Uchida

(10) Patent No.: US 6,377,630 B1
(45) Date of Patent: Apr. 23, 2002

(54) TRANSMISSION CIRCUIT

(75) Inventor: Tetsuro Uchida, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/270,822

(22) Filed: Mar. 16, 1999

(30) Foreign Application Priority Data

Mar. 20, 1998 (JP) .......................................... 10-092751

(51) Int. Cl.[7] .............................................. H04L 27/10
(52) U.S. Cl. ...................... 375/278; 375/296; 375/297; 455/127
(58) Field of Search ................................ 375/296, 297, 375/307, 312, 275, 278, 284, 285; 332/107, 123, 124, 125, 126, 127, 128, 100, 117; 455/113, 115, 116, 117, 119, 127; 331/10, 175

(56) References Cited

U.S. PATENT DOCUMENTS

| | | | | |
|---|---|---|---|---|
| 4,731,870 A | * | 3/1988 | Black et al. ................. 455/127 |
| 4,859,967 A | * | 8/1989 | Swanson ..................... 330/298 |
| 4,932,073 A | * | 6/1990 | Ueda ........................... 455/113 |
| 5,033,111 A | * | 7/1991 | Marui ......................... 455/574 |
| 5,506,546 A | * | 4/1996 | Kowaguchi ................. 332/103 |
| 5,883,927 A | * | 3/1999 | Madsen et al. ............. 375/296 |
| 5,995,853 A | * | 11/1999 | Park ............................ 455/574 |

* cited by examiner

Primary Examiner—Chi Pham
Assistant Examiner—Phuong Phu
(74) Attorney, Agent, or Firm—Whitham, Curtis & Christofferson

(57) ABSTRACT

A transmission circuit comprises a fixed-frequency oscillator for oscillating a frequency for the transmission, a voltage controlled oscillator for outputting a signal containing a modulation signal component, a frequency mixer for mixing an output signal of the fixed-frequency oscillator and an output signal of the voltage controlled oscillator, a high-frequency amplifier for amplifying output of the frequency mixer and supplying the amplified signal to a transmission antenna, and a power control circuit for first turning on power of the voltage controlled oscillator and the high-frequency amplifier at the beginning of the transmission and after expiration of a predetermined time, turning on power of the fixed-frequency oscillator.

7 Claims, 2 Drawing Sheets

TRANSMISSION CIRCUIT

BACKGROUND OF THE INVENTION

The present invention relates to a transmission circuit of a type wherein turning on/off a transmission state is repeated and in particular to a transmission circuit for reducing occurrence of spurious modulation noises at the beginning of the transmission.

A voltage controlled oscillator (VCO) whose oscillation frequency can be controlled according to voltage is used as an intermediate-frequency signal source of a transmission circuit. The VCO is not used singly and is built in a part of a phase locked loop (PLL) for use. The VCO used as an intermediate-frequency signal source of a transmission circuit has an oscillation frequency modulated by a modulation signal. The frequency shift keying (FSK) is one of preferred modulation techniques.

FIG. 3 is a block diagram to show an example of a transmission circuit using a VCO in a related art. In the figure, numeral 1 denotes a fixed-frequency oscillator for transmission, numeral 2 denotes a VCO for outputting a signal containing a modulation signal component, numeral 3 denotes a frequency mixer for mixing (for example, upconverting) an output signal of the fixed-frequency oscillator 1 and an output signal of the VCO 2, and numeral 4 denotes a high-frequency amplifier for amplifying output of the frequency mixer 3 and supplying the amplified signal to a transmission antenna 5. The VCO 2 is built in a PLL 6.

Output of the fixed-frequency oscillator 1 is supplied to the frequency mixer 3 through a narrow-band-pass filter 7. Output of the high-frequency amplifier 4 is supplied to the transmission antenna 5 through a wide-band-pass filter 8. Output of the mixer 3 is supplied to the amplifier 4 through a band-pass filter 9 used as required. An external crystal oscillator and an external loop filter connected to the PLL 6 and an external circuit for inputting a modulation signal to the VCO 2 are not shown.

The transmission circuit in FIG. 3 controls turning on/off power supply +B in two blocks. A first power control block 11 is controlled by a switch SW1 and contains the fixed-frequency oscillator 1, the filter 7, the mixer 3, and the filter 9. A second power control block 12 is controlled by a switch SW2 and contains the amplifier 4.

It is assumed that the transmission circuit in FIG. 3 is not held in a transmission state all the time and that turning on/off the transmission circuit is repeated frequently. At the beginning of the transmission, the switch SW1 is first turned on for first operating the fixed-frequency oscillator 1. Then, oscillation of the oscillator 1 becomes stable before the switch SW2 is turned on for operating the amplifier 4. Therefore, output of the amplifier 4 reaches the maximum amplitude at the same time as the switch SW2 is turned on as shown in a waveform chart in FIG. 3.

If power control is performed in the first and second power control blocks 11 and 12 for sequentially turning on the SW1 and SW2 as in the transmission circuit in the related art shown in FIG. 3, a high-level signal is oscillated suddenly, thus spurious modulation noise occurs. FIG. 4 is a spectrum characteristic chart to show the fact. In the figure, waveform S indicated by the solid line shows the spectrum of a transmission signal of center frequency $f_0$. In contrast, waveform N which is hatched denotes the spurious modulation noise.

The configuration of the transmission circuit in FIG. 3 does not involve any problem if the spurious modulation noise N can be removed through the filter 8 placed at the stage following the amplifier 4. However, since the filter 8 has the bandwidth set wide so as to cover a plurality of channels, noise removal with a limited band cannot be expected and after all, output having a characteristic similar to that in FIG. 4 is transmitted from the antenna 5. This point is the problem to be solved by the present invention.

SUMMARY OF THE INVENTION

It is therefore an object of the invention to provide a transmission circuit wherein the spurious modulation noise occurrence level can be remarkably decreased by changing the power control order.

In order to achieve the above object, there is provided a transmission circuit comprising: a fixed-frequency oscillator for oscillating a frequency for the transmission; a voltage controlled oscillator for outputting a signal containing a modulation signal component; a frequency mixer for mixing an output signal of the fixed-frequency oscillator and an output signal of the voltage controlled oscillator; a high-frequency amplifier for amplifying output of the frequency mixer and supplying the amplified signal to a transmission antenna; and a power control circuit for first turning on power of the voltage controlled oscillator and the high-frequency amplifier at the beginning of the transmission and after expiration of a predetermined time, turning on power of the fixed-frequency oscillator.

In the transmission circuit, the power control circuit turns on the power of the fixed-frequency oscillator after the oscillation of the voltage controlled oscillator becomes stable.

In the transmission circuit, the voltage controlled oscillator is built in a phase-controlled loop. Output of the fixed-frequency oscillator is supplied to the frequency mixer through a narrow-band-pass filter. Output of the high-frequency amplifier is supplied to the transmission antenna through a wide-band-pass filter.

BRIEF DESCRIPTION OF THE PREFERRED EMBODIMENTS

Figure 1:
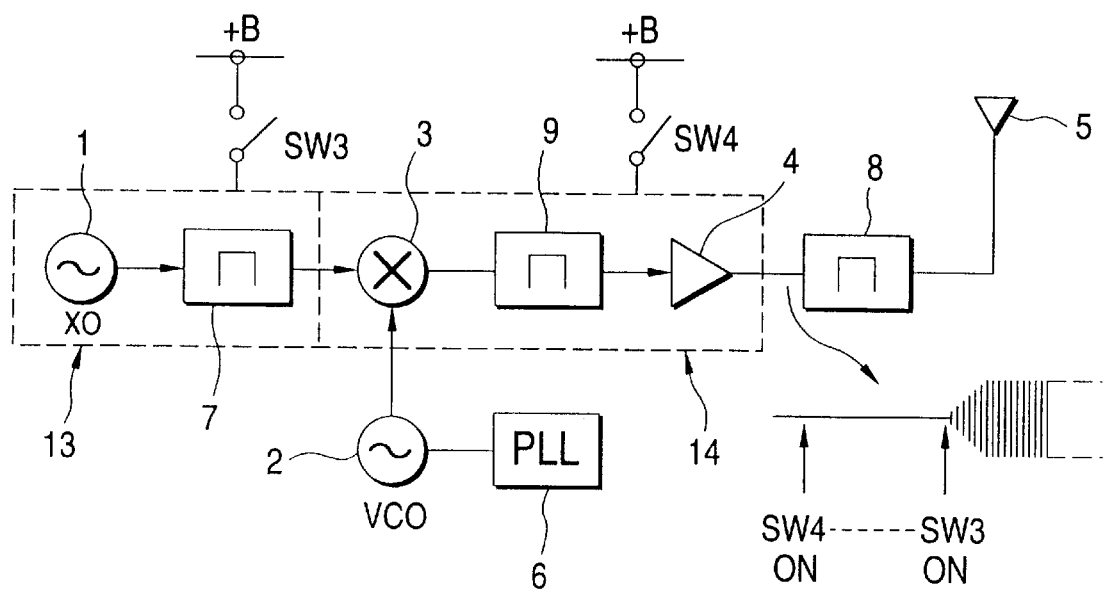
FIG. 1 is a block diagram to show one embodiment of a transmission circuit according to the present invention.
Figure 3:
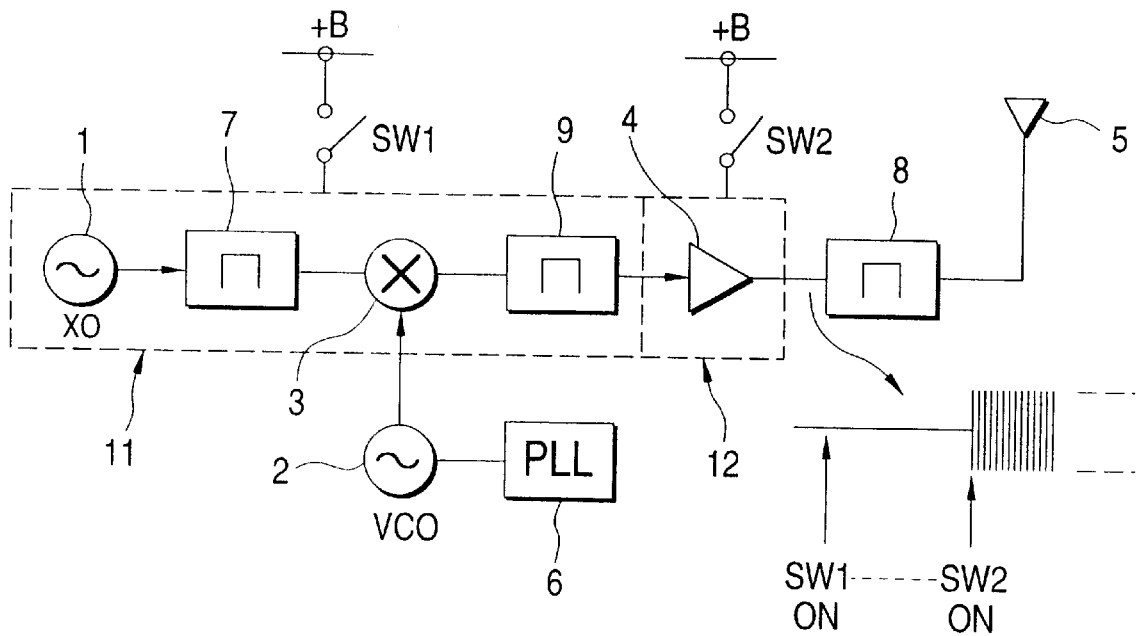
FIG. 3 is a block diagram to show an example of a transmission circuit in a related art.
Figure 4:
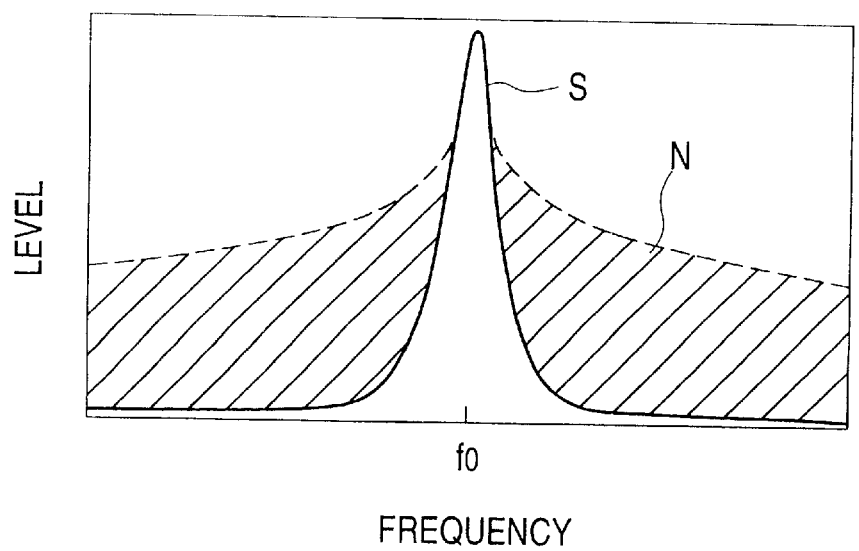
FIG. 4 is a characteristic chart to show the spectrum of a transmission signal of the transmission circuit in FIG. 3.

Referring now to the accompanying drawings, there is shown one embodiment of the invention. FIG. 1 is a block diagram to show one embodiment of a transmission circuit according to the present invention. The transmission circuit of the invention shown in FIG. 1 has the same configuration as that in FIG. 3 except for the portion related to power control. Parts identical with those previously described with reference to FIG. 3 are denoted by the same reference numerals in FIG. 1 and will not be discussed again in detail. Also in the transmission circuit of the invention, power control is performed in two power control blocks, which differ from those in FIG. 3.

A first power control block 13 of the transmission circuit shown in FIG. 1 contains a fixed-frequency oscillator 1 and a narrow-band-pass filter 7. A second power control block 14 contains a mixer 3, a filter 9, and an amplifier 4. On/off control of power supply +B to the first power control block 13 is performed by a first power control switch SW3. On the other hand, on/off control of power supply +B to the second power control block 14 is performed by a second power control switch SW4.

The switches SW3 and SW4 are sequentially turned on at the beginning of the transmission in reverse order to how the switches SW1 and SW2 of the transmission circuit in the related art shown in FIG. 3 are turned on. That is, at the beginning of the transmission, the first the switch SW4 is turned on for first turning on power of a VCO 2 and a high-frequency amplifier 4, then oscillation of the VCO 2 becomes stable after the expiration of a predetermined time, and then the switch SW3 is turned on for turning on power of the fixed-frequency oscillator 1.

Figure 2:
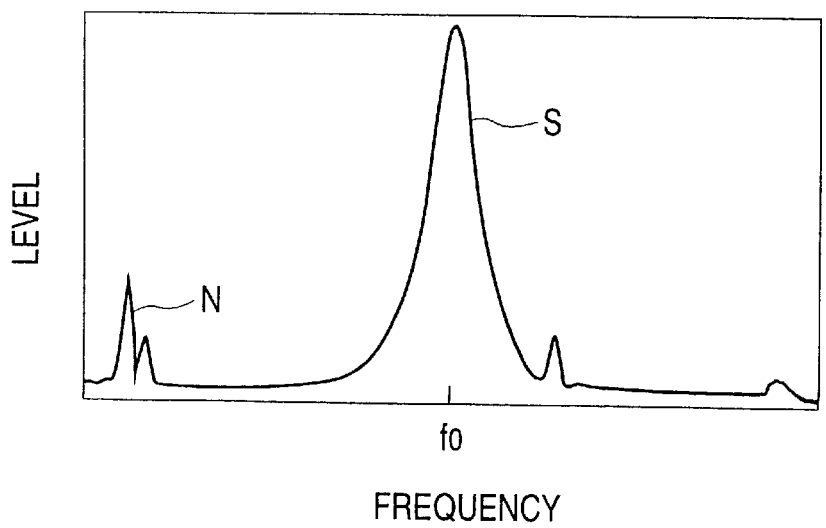
FIG. 2 is a characteristic chart to show the spectrum of a transmission signal of the transmission circuit in FIG. 1.

As output level of the fixed-frequency oscillator 1 is gradually increased and then becomes stable, output of the amplifier 4 does not reach the maximum amplitude immediately when the switch SW3 is turned on, and becomes a waveform with the gradually increasing level as shown in a waveform chart in FIG. 1. Thus, as shown in FIG. 2, the level of harmful spurious modulation noise caused by shock at start-up is decreased remarkably and only the spectrum of a transmission signal S becomes noticeable.

As the narrow-band-pass filter 7 reduces undesired noise components in the output from the fixed-frequency oscillator 1 by the band limitation function thereof until the fixed-frequency oscillator 1 becomes stable, the spurious modulation noise suppression effect of the present invention resulted from power control delaying start-up of the fixed-frequency oscillator 1 can be further enhanced. Therefore, the present invention is effective if it is applied particularly to a transmission circuit wherein turning on/off a transmission state is repeated at high speed.

As described above, according to the invention, a transmission circuit wherein the spurious noise occurrence level is decreased remarkably can be provided by a simple method of changing the power control order.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A transmission circuit comprising:

a fixed-frequency oscillator for oscillating a frequency for a transmission;

a voltage controlled oscillator for outputting a signal containing a modulation signal component;

a frequency mixer for mixing an output signal of the fixed-frequency oscillator and an output signal of the voltage controlled oscillator;

a high-frequency amplifier for amplifying output of the frequency mixer and supplying the amplified signal to a transmission antenna; and a power control circuit for first turning on power of the voltage controlled oscillator and the high-frequency amplifier at the beginning of the transmission and after expiration of a predetermined time, turning on power of the fixed-frequency oscillator.

2. The transmission circuit as set forth in claim 1 wherein the voltage controlled oscillator is built in a phase-controlled loop.

3. The transmission circuit as claimed in claim 1 wherein output of the fixed-frequency oscillator is supplied to the frequency mixer through a narrow-band-pass filter.

4. The transmission circuit as set forth in claim 1 wherein output of the high-frequency amplifier is supplied to the transmission antenna through a wide-band-pass filter.

5. The transmission circuit as set forth in claim 1, wherein the power control circuit turns on the power of the fixed-frequency oscillator after the oscillation of the voltage controlled oscillator becomes stable.

6. A method for suppressing a spurious modulation noise in a transmission circuit, which comprises:

a first control circuit block including a fixed-frequency oscillator for oscillating a frequency for a transmission;

a first switch for supplying power to the first control circuit block;

a second control circuit block including:

a voltage controlled oscillator for outputting a signal containing a modulation signal component;

a frequency mixer for mixing an output signal of the fixed-frequency oscillator and an output signal of the voltage controlled oscillator;

a high-frequency amplifier for amplifying output of the frequency mixer and supplying the amplified signal to a transmission antenna; and a second switch for supplying power to the second circuit block, the method comprising the steps of:

turning on power of the second switch; and turning on power of the first switch.

7. The method as set forth in claim 6, wherein the first switch is turned on after the oscillation of the voltage controlled oscillator becomes stable.

* * * * *